(12) United States Patent
Ozawa (10) Patent No.: US 7,515,244 B2
(45) Date of Patent: Apr. 7, 2009

(54) PRINT PRODUCTION SYSTEM

(75) Inventor: Satoshi Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 430 days.

(21) Appl. No.: 11/395,307

(22) Filed: Apr. 3, 2006

(65) Prior Publication Data

US 2006/0244936 A1   Nov. 2, 2006

(30) Foreign Application Priority Data

Apr. 1, 2005   (JP) ............................. 2005-106395

(51) Int. Cl.
*G03B 27/52*   (2006.01)
*G06F 3/12*   (2006.01)

(52) U.S. Cl. ........................................ 355/40; 358/1.15

(58) Field of Classification Search .................... 355/27, 355/40–41; 358/1.13–1.15, 406, 408; 709/203; 382/100
See application file for complete search history.

(56) References Cited

U.S. PATENT DOCUMENTS 6,891,595 B2 *   5/2005   Oka et al. ...................... 355/40
7,271,928 B2 *   9/2007   Naito et al. .................. 358/1.15
7,417,755 B2 *   8/2008   Imaizumi et al. ........... 358/1.15
7,446,898 B2 *  11/2008   Tsue et al. .................... 358/1.6

\* cited by examiner

*Primary Examiner*—Hung Henry Nguyen
(74) *Attorney, Agent, or Firm*—Sughrue Mion, PLLC (57) ABSTRACT

The print production system includes at least one order receiver including an image acquisition unit for acquiring first image data, an input unit for inputting a print order of a second image data in the first image data and a reception processing unit outputting order information and second image data related to each other by the reception processing unit, and an image forming apparatus including an image processing unit for performing image processing on the second image data to create third image data, and a print production unit for producing prints of the third image data. At least one of transfer of the second image data from the reception processing unit to the image processing unit and transfer of the third image data from the image processing unit to the print production unit is performed such that image data of images of a predetermined number of frames are transferred at a time.

12 Claims, 4 Drawing Sheets

PRINT PRODUCTION SYSTEM

The entire contents of the documents cited in this specification are herein incorporated by reference.

BACKGROUND OF THE INVENTION

The present invention relates to a print production system in which an order (print production order) for production of prints of images photographed with a camera, a digital camera, or the like is received, and the prints are produced.

As a technique of producing prints from images photographed on a film, a so-called digital mini-laboratory has been put into practical use. In the digital mini-laboratory, the images photographed on the film are photoelectrically read with a CCD sensor or the like, output images (image data) are obtained by performing predetermined image processing on the read images (image data), printing paper is exposed by scanning it with recording light, such as laser light, which has been modulated in accordance with the output images, and predetermined wet processing is performed on the exposed printing paper.

Meanwhile, a digital camera has come into more widespread use along with the popularization of a personal computer (PC), a personal digital assistance (PDA), and the like. In addition, a portable telephone having a photographing function has become popular.

In general, images (image data) photographed with the digital camera, the portable telephone, or the like are captured in a PC or the like to be processed, and then used for various applications such as website creation or new year greeting card creation. However, there is also a strong demand for preserving such photographed images as high-quality (photographic) prints.

This demand can be met by the digital mini-laboratory that deals with images as image data and is therefore capable of coping also with production of prints from images photographed with the digital cameral or the like with ease.

Under such circumstances, specialized venders of laboratories or the like have recently started using such a digital mini-laboratory for production of prints from images photographed with the digital camera, the portable telephone, or the like, in addition to production of prints from images photographed on a film.

When an order for producing prints from images photographed with the digital camera or the like is placed with a print vender, for example, a print order receiver (hereinafter referred to simply as "receiver") installed in a store such as a laboratory, or various commercial facilities is used to place the order.

In general, when a recording medium, such as a memory card, an IC card, or a CD-R, which stores photographed images is loaded on the receiver, or when a digital camera or a portable telephone is connected to the receiver directly or by using connection means, the receiver reads images and displays the images together with an order screen on a display.

A customer (print orderer) inputs order information including images to be printed, print sizes, the number of prints for each image, and the like by using a touch panel display or a predetermined inputting method. When an order is established, the receiver relates the images and the inputted information (order information) to each other and sends the images and the order information to, for instance, a server or an image processor of a laboratory, and the images are supplied therefrom to a digital photo printing system such as the digital mini-laboratory, in which prints are produced in accordance with the order information, and the produced prints are outputted.

Such production of prints from images photographed with the digital camera or the like does not involve film development processing, so that print production work is simplified and swift print production is possible. Also, reduction in processing time in the digital mini-laboratory and improvement in processing accuracy, workability, and the like of the digital mini-laboratory are being achieved. Further, techniques for reducing the time required for the development processing of exposed printing paper and the like are under way.

Against this backdrop, in the case of production of prints from images photographed with the digital camera or the like, as compared with a case of ordinary production of prints from a film, it is possible to significantly shorten a time required to provide prints to a customer after reception of a print order.

SUMMARY OF THE INVENTION

Incidentally, in such a print production system, every step, such as order reception, image processing, or output (print production), proceeds to the next step when processing for one order in the relevant step is completed. That is, transfer of image data among individual steps is performed on an order-by-order basis.

When ordered printing is carried out on an order-by-order basis, it is advantageous that management for each print order can be performed with ease and with reliability, but there is a problem in that in the case of a print order in which the number of frames is large, a time taken by each step is elongated and therefore an extremely long time is elapsed between order reception and output completion. Also, each step is carried out on an order-by-order basis, which raises a problem in that waits for completion of processing generate among steps and therefore processing efficiency is lowered.

Further, an order for print production from a large number of frames raises a problem in that it takes a long time to output data among individual steps and therefore interfaces are occupied for a long time, so that in the case of a configuration connected to multiple receivers, it becomes impossible for remaining receivers to output print orders. Still further, there is also a problem in that when multiple print orders are outputted at the same time, a communication speed (transfer speed) is extremely lowered and therefore a time that is longer than required is taken.

An object of the present invention is to solve the problems of the conventional techniques described above and to provide a print production system capable of shortening a time between reception of an order and output of prints, in particular, creating prints with efficiency even when an order for print production from a large number of frames is received.

In order to attain the object described above, the invention provides a print production system, comprising at least one order receiver, each including image acquisition means for acquiring first image data of first images to perform print orders, each ordering at least one print, input means for inputting a print order for ordering as one order a print or prints of a second image or images selected from the first images corresponding to the first image data acquired by the image acquisition means, and reception processing means for creating order information on an order-by-order basis based on the print order inputted by the input means, and for relating the created order information and second image data of the second image or images corresponding to the inputted print order to each other, wherein each order receiver outputs the order information and the second image data related to each other by the reception processing means; and an image forming apparatus including image processing means for performing image processing on the second image data outputted from the order receiver to create third image data, and print production means for producing the print or prints of the second image or images corresponding to the third image data based on the third image data on which the image processing has been performed by the image processing means, wherein the print or prints of the second image or images are produced in accordance with the order information by the print production means and outputted, wherein at least one of transfer of the second image data from the reception processing means of the order receiver to the image processing means of the image forming apparatus and transfer of the third image data from the image processing means of the image forming apparatus to the print production means thereof is performed such that image data of images of a predetermined number of frames are transferred at a time.

Preferably, the order receiver further includes a first output means for outputting the second image data to the image forming apparatus, and wherein the image forming apparatus further includes a second output means for outputting the third image data from the image processing means to the print production means.

Preferably, at least one of transfer of the second image data from the reception processing means to the first output means, transfer of the second image data from the first output means to the image processing means, transfer of the third image data from the image processing means to the second output means, and transfer of the third image data from the second output means to the print production means is performed such that the image data of the images of the predetermined number of frames are transferred at a time.

Preferably, the image processing means starts the image processing after reception of the second image data corresponding to one order in the print orders has been completed.

Preferably, every transfer of the second and third image data is performed such that the image data of the images of the predetermined number of frames are transferred at a time.

Preferably, the transfer of the second and third image data is performed such that the image data of an image of one frame is transferred at a time.

Preferably, the image forming apparatus further includes distribution means for distributing output prints in accordance with which order receiver has outputted the print order corresponding to the output prints.

Preferably, the image forming apparatus further includes print producing sequence setting means for setting a print producing sequence for each print order, and wherein the print producing sequence setting means discriminates a number of frames corresponding to the print order based on the order information corresponding to the print order, and sets a position of the print producing sequence of the print order in case that the discriminated number of frames is equal to or less than a predetermined number prior to a position of the print producing sequence of other print orders which has already been set in case that the discriminated number of frames is more than the predetermined number.

Preferably, the order receiver has a function for selection of urgent finishing in which print production is performed preferentially and, when the urgent finishing has been selected, outputs urgent information showing that the urgent finishing has been selected, by giving the urgent information to the order information, wherein the image forming apparatus further includes print producing sequence setting means for setting a print producing sequence for each print order, and wherein the print producing sequence setting means discriminates whether the urgent finishing has been selected for the print order based on the order information corresponding to the print order, and sets a position of the print producing sequence of the print order in case that the urgent finishing has been selected for the print order prior to a position of the print producing sequence of other print orders which has already been set.

It is preferable that the print production system further comprises a film scanner that generates the first image data by reading a photographic film.

Preferably, the image forming apparatus further includes order processing sequence setting means for setting an order processing sequence for each print order, and wherein the order processing sequence setting means discriminates a number of frames corresponding to the print order based on the order information corresponding to the print order and sets the order processing sequence so that when the discriminated number of frames is equal to or less than a predetermined number, the print order is processed preferentially with respect to other print orders for each of which the print processing order setting has already been set and in which the discriminated number of frames is more than the predetermined number.

Preferably, the order receiver has a function for selection of urgent finishing in which print production is performed preferentially and, when the urgent finishing has been selected, outputs urgent information showing that the urgent finishing has been selected, by giving the urgent information to the order information, wherein the image forming apparatus further includes order processing sequence setting means for setting an order processing sequence for each print order, and wherein the order processing sequence setting means discriminates whether the urgent finishing has been selected for the print order based on the order information corresponding to the print order and sets the order processing sequence so that when the urgent finishing has been selected for the print order, the print order is processed preferentially with respect to other print orders for each of which the order processing sequence has already been set.

According to the present invention, by transferring image data of a predetermined number of frames at a time or as one unit of a predetermined number of frames, it is possible to shorten a time for waiting until completion of preceding processing in each processing between relating of order data and image data to each other and output of prints, which allows prints to be outputted more efficiently from the viewpoint of the entire system. In particular, in the case of an order for print production from a large number of frames, by transferring image data of a predetermined number of frames at a time, it is possible to improve processing efficiency and output prints with higher efficiency.

Also, by transferring image data of a predetermined number of frames at a time, it is possible to reduce an amount of information outputted at a time, which enables prevention of lowering of a communication speed and the like.

DETAILED DESCRIPTION OF THE PREFERRED EMBODIMENTS

The print production system according to the present invention will be described below in detail based on preferred embodiments with reference to the accompanying drawings.

Figure 1:
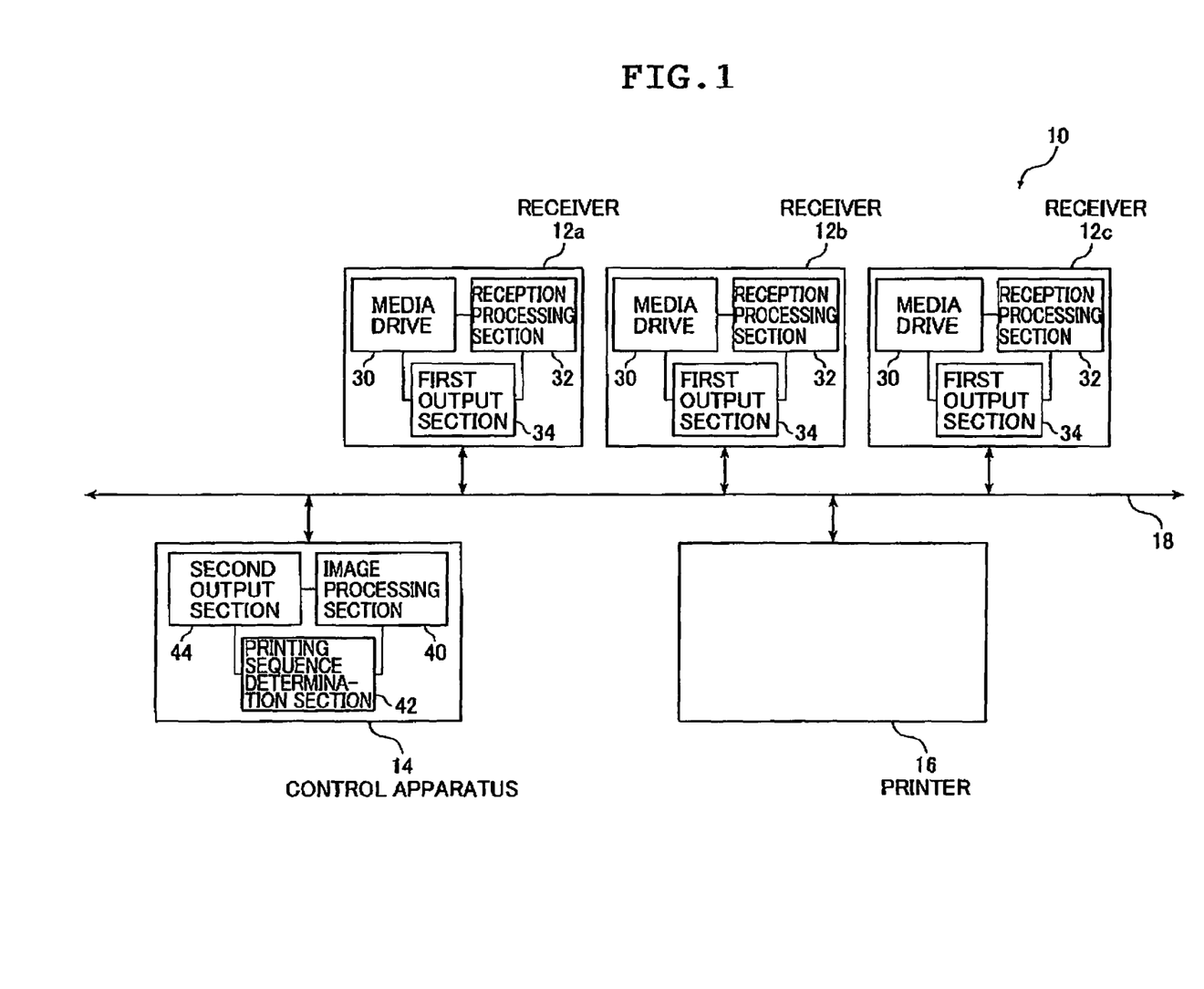
FIG. 1 is a block diagram conceptually showing an example a the print production system according to the present invention.

FIG. 1 is a block diagram conceptually showing an example of the print production system according to the present invention.

A print production system 10 (hereinafter referred to as the "production system 10") in the illustrated example is used for producing (photographic) prints which correspond to an order placed by a customer (order information provided by the customer), from image data of images photographed with a digital camera, a portable telephone, or the like, and includes print order receivers 12 (hereinafter referred to as the "receivers 12"), a system controller 14 (hereinafter referred to as the "control apparatus 14"), and a printer 16, for instance. Those devices are connected to each other through a known network 18.

It should be noted that in the illustrated example, the production system 10 includes three receivers 12 (12a, 12b, and 12c) but the number of the receivers 12 in the print production system that uses the receivers 12 is not limited to three and may be decreased to one or two or increased to four or more. Also, there occurs no problem even when the production system 10 includes multiple control apparatuses 14 and/or multiple printers 16.

Each receiver 12 is installed in a laboratory, commercial facilities, or the like and receives an order for print production from image data of images photographed with an imaging device, such as a digital camera or a portable telephone having a photographing function, and includes a media drive 30 that reads/records image data from/into a storage medium (storage media), a reception processing section 32 that relates the image data and order information to each other, and a first output section 34 that outputs the image data and the like to the control apparatus 14. In this regard, although not illustrated, the receiver 12 further includes a display, a display controller that controls the display, a printer that creates a print order reception slip (claim check), a CPU, a ROM, a RAM, and the like.

The receiver 12 has a function of making a selection from among ordinary finishing and urgent finishing to be described later, reads image data from a storage medium loaded into the media drive 30, relates information (order information) on a print order inputted through the reception processing section 32 and the image data to each other, and supplies the order information and the image data related to each other from the first output section 34 to the control apparatus 14.

There is no particular limit on the storage medium accepted by the receiver 12 (that is, the media drive 30) and known storage media, such as SmartMedia™, CompactFlash™, Memory Stick™, an SD Memory Card™, a PC card, a CD-R, and an MD, are all usable. Needless to say, the storage medium accepted by the receiver 12 is not limited to one type but multiple types of storage media may be accepted. Also, the receiver 12 may read images directly from a digital camera, a portable telephone, or the like by using predetermined connection means or the like.

A method for placing a print order at the receiver 12 is not specifically limited and it is sufficient that a method that is the same as that in the case of a known print order receiver is used.

For instance, the display is set as a touch panel that doubles as operation means and an operator performs various operations, such as selection of images to be printed, input of the numbers of prints to be made, input of the sizes of the prints, and various other designation and input using a known graphical user interface (GUI) realized by displaying images read from the storage medium and display images for various operations, designation, and the like on the display.

In the production system 10, it is possible to make a selection from among ordinary finishing, in which ordinary print production is performed, and urgent finishing, and the selection from among the ordinary finishing and the urgent finishing is made at the receiver 12 concurrently with print order input.

The urgent finishing is a service in which print production is performed preferentially as compared with an order of the ordinary finishing and prints are provided swiftly. For instance, in the case of an order designating the urgent finishing, the order is processed prior to other orders of the ordinary finishing placed before the order (that is, while getting ahead of the other orders) within a possible range and prints are produced in a shortest time within a possible range so as to output the prints about several to ten minutes after the order placement, thereby making it possible to immediately provide the prints to a customer, who is waiting for the prints on the spot (or at a predetermined position close to the receiver 12) after having placed the order. Here, in the production system 10, it is preferable that a fee for the urgent finishing be set higher than that for the ordinary finishing. In addition, the amount of the fee may be changed in accordance with a finish time.

It should be noted that the receiver 12 may not particularly include ordinary finishing selection means and may only include urgent finishing selection means. In this case, each order designating the urgent finishing may be processed by performing the urgent finishing and each order that does not designate the urgent finishing may be processed by performing the ordinary finishing.

The reception processing section 32 of the receiver 12 generates an order ID (identification information) for each inputted print order, processes order instructions inputted for the print order, relates order information and image data to each other by frames, and outputs the image data, to which the order information has been related, to the first output section 34 each time the image data of one frame and the order information have been related to each other. The order information shows the order ID, images whose prints are to be produced, the numbers of the prints, the sizes of the prints, a predicted finish time, whether the urgent finishing or the ordinary finishing has been selected, and the like. The first output section 34 outputs (supplies) the image data, to which the order information has been related, to the control apparatus 14 through the network 18 on a frame-by-frame basis. Here, to the image data of one frame, a frame ID for identifying the frame is related as the order information.

Also, when relating of image data and order information to each other is completed with respect to a print order, that is, when the order is established, information (hereinafter referred to as the "approval information") notifying that the order has been established is outputted from the reception processing section 32 to the first output section 34 and then is outputted from the first output section 34 to the control apparatus 14 through the network 18.

In addition, in the illustrated example, as a preferable form, the receiver 12 adds identification information used for identifying itself (that is, in the illustrated example, information with which it is possible to identify whether the receiver 12 is the receiver 12a, the receiver 12b, or the receiver 12c) to the order information.

Also, for each received order, a reception slip (claim check) on which necessary information, such as an order ID, a print fee, and a delivery date or time, has been recorded is created and outputted.

It should be noted that the predicted finish time is calculated by the control apparatus 14 to be described later from a status of the production system 10 and is supplied to a corresponding receiver 12. In addition, the receiver 12 may only add information showing that the urgent finishing has been instructed to the order information, and when the ordinary finishing has been instructed, the receiver may not add such information to the order information. In this case, in the production system 10, every order instructing no urgent finishing will be processed by performing the ordinary finishing.

It should be noted that in the production system 10, a print order can be received not only from the dedicated receiver 12 installed in a store or the like but also from a personal computer (PC) provided at home or the like for placing a so-called Internet order in which a print production order is placed through a computer communication network such as the Internet, a portable telephone for placing an e-mail order, or the like. In other words, a customer's home PC or the like may function as the print order receiver in the production system 10 according to the present invention. In this case, for instance, the PC or the like may function as the print order receiver by accessing and browsing a laboratory website or the like. Alternatively, the PC or the like may function as the print order receiver by executing dedicated ordering software downloaded/installed thereinto/thereonto.

Also, a PC provided in a laboratory or the like may function as the print order receiver in the system 10 by executing dedicated order receiving software installed thereonto.

The control apparatus 14 includes an image processing section 40 that performs image processing on image data, a printing sequence determination section 42 that determines the printing sequence (print producing sequence) of image data, and a second output section 44 that outputs image data to the printer 16. With this construction, the control apparatus 14 receives image data outputted on a frame-by-frame basis from the receiver 12 (first output section 34 thereof), receives approval information, and then generates output image data adapted for print production by the printer 16 by performing predetermined image processing on the image data corresponding to an established order at the image processing section 40. The image processing section 40 outputs the output image data obtained as a result of the image processing to the second output section 44 on a frame-by-frame basis. The second output section 44 supplies (outputs) the output image data to the printer 16 on a frame-by-frame basis. In other words, the output image data is supplied to the printer 16 on a frame-by-frame basis. Also, after having sent out the whole of image data corresponding to an order, the control apparatus 14 further supplies sort information indicative of the end of the order to the printer 16.

The image processing carried out by the image processing section 40 of the control apparatus 14 is not specifically limited, and it is possible to use various known image processing such as image enlargement/reduction (electronic scaling), gradation correction, color/density correction, color saturation correction, and sharpness processing. Also, it is sufficient that each image processing described above is executed with a known method.

Here, in the production system 10, images and order information corresponding to the orders received by all receivers 12 are gathered to the control apparatus 14. The printing sequence determination section 42 of the control apparatus 14 determines an image processing sequence and a print production sequence for the orders in consideration of predicted finish times. Then, in accordance with the determined sequences, image processing corresponding to the orders is performed and the output image data and order information corresponding to the orders are sequentially outputted to the printer 16. Here, the printing sequence determination section 42 also determines the printing sequence of the image data to be printed by the printer 16. Also, the printing sequence determination section 42 determines the processing sequence of orders so that each order designating the urgent finishing may preferentially be processed while getting ahead of other orders designating the ordinary finishing and prints corresponding to the relevant order may be finished with the shortest waiting time as long as prints corresponding to the other orders can be finished on time.

Further, the control apparatus 14 computes predicted print finish times from the number of images that the control apparatus 14 holds, the print sizes of the images, order information from the receivers 12, an operating status of the printer 16, a processing capability (number of prints that are outputtable per unit time) of the printer 16, and the like and supplies the computed predicted print finish times to the receivers 12. For each order designating the urgent finishing, the control apparatus 14 computes the predicated finish time so that prints corresponding to the order may be finished with the shortest waiting time as long as prints corresponding to other orders can be finished on time as is the case of the processing sequence determination.

It should be noted that multiple printers 16 may be connected to the production system 10. In this case, the control apparatus 14 may make printer selections for image output in consideration of reception times of orders, the operating statuses of the printers 16, and the like.

Also, multiple control apparatuses 14 may be connected to the production system 10. In this case, one of the control apparatuses 14 will acquire information from all other control apparatuses 14 and performs management and control of processing of all orders, the determination of the processing sequence, the computation of the predicted finish times, and the like.

Also, in the production system 10, not the receiver 12 but the control apparatus 14 may acquire image data from a storage medium or the like and receive input of print order information. Even in this case, like in the case described above, print images will be generated by performing image processing corresponding to the order data on the acquired images and supplied to the printer 16.

That is, in this case, the control apparatus 14 functions as the print order receiver constituting the system according to the present invention.

The printer 16 is a digital photo printer that produces prints by exposing a photosensitive material (printing paper) in accordance with output image data and order information supplied (outputted) from the control apparatus 14 (second output section 44 thereof) to form latent images, performing predetermined wet development on the exposed photosensitive material, and then drying the material.

More specifically, in the printer 16, a predetermined (photosensitive material) magazine containing a photosensitive material roll obtained by winding up a long photosensitive material in roll form is loaded at a predetermined position and supplies the printing paper. The printer 16 cuts the photosensitive material in a length corresponding to the size of prints to be produced in accordance with the order information supplied from the control apparatus 14, records back prints. (performs back printing), and then records latent images by exposing the photosensitive material by means of a scanning with a light beam (recording light) modulated in accordance with the output image data supplied (outputted) from the control apparatus 14. Note that in the case of orders designating the urgent finishing, back prints for the urgent finishing are recorded.

Next, the printer 16 obtains (finished photographic) prints by performing predetermined wet development processing (development, bleaching/fixing, and washing with water) on the exposed photosensitive material and then drying the material, and outputs the obtained prints while performing a sorting by orders.

Also, it is preferable that the printer 16 distribute output prints in accordance with which receivers have received the orders for the prints.

More specifically, it is possible to use a method with which a print discharge direction is changed in accordance with which receivers have received the orders, a method with which the identification numbers of the receivers are recorded as back prints, a method with which a print for identification is outputted for each order, or the like.

Next, an operation of the print production system 10 according to the present invention will be described in detail.

Figure 2A:
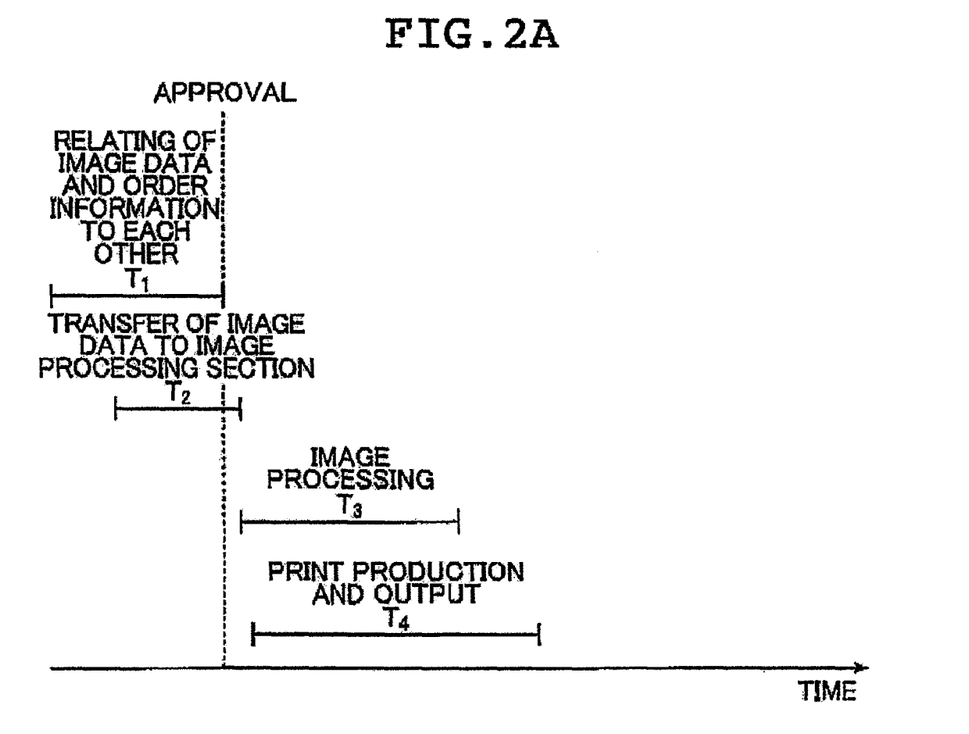
FIG. 2A is a timing chart showing a relation between an elapsed time and processing of an order at each section in the print production system according to the present invention.

Here, FIG. 2A is a timing chart showing a relation between processing of an order at each section and an elapsed time in the print production system 10. Hereinafter, a case where an order for print production from 24 frames is processed will be described.

First, the receiver 12 relates image data read by the media drive 30 or the like and order information inputted by a user, an operator, or the like to each other at the reception processing section 32 (T1 shown in FIG. 2A). Here, the relating takes an arbitrary time that varies with the operator, user, or the like inputting order information.

The receiver 12 outputs the image data after the relating from the first output section 34 to the control apparatus 14 sequentially on a frame-by-frame basis (T2 shown in FIG. 2A). For instance, when the speed of the output of the image data from the receiver 12 to the control apparatus 14, that is, from the reception processing section 32 to the image processing section 40 of the control apparatus 14 through the first output section 34 is 4 MB/s, T2 takes 14.4 seconds.

When the order information related to the image data outputted to the control apparatus 14 (image processing section 40 thereof) is to be changed, that is, for instance, when the numbers or sizes of the prints are to be changed, frame IDs of the image data related to the order information to be changed are outputted to the control apparatus 14. The control apparatus 14 detects the image data with the frame IDs in question and changes/corrects the order information related to the detected image data.

After order information of an order is established and output of image data, to which the order information has been related, to the control apparatus 14 is completed, the receiver 12 outputs to the control apparatus 14 approval information notifying that the image data and the order information have been established with respect to the order. Here, in this embodiment, it is assumed that a time period from the order establishment to the approval information transfer is needed to be 0.6 seconds.

On receiving the approval information from the receiver 12 (first output section 34 thereof), the control apparatus 14 performs image processing based on the order information on the image data corresponding to the approved order at the image processing section 40 (T3 shown in FIG. 2A). For instance, when the processing capability of the image processing section 40 is 1800 frames/h, T3 takes 48 seconds.

If having received information for change/correction of the order information, the control apparatus 14 starts the image processing of the image data after having completed the change/correction.

The image processing section 40 performs the image processing on the image data to obtain output image data and outputs the output image data to the second output section 44 on a frame-by-frame basis. The second output section 44 outputs the output image data to the printer 16 sequentially on a frame-by-frame basis.

The printer 16 exposes the photosensitive material in accordance with the output image data and the order information outputted from the control apparatus 14 (second output section 44 thereof) to form latent images, performs predetermined wet development on the exposed photosensitive material, dries the developed material to obtain prints, and outputs the prints (T4 shown in FIG. 2A). For instance, when a time required for development of one print is 60 seconds and the interval between each two prints is 3.6 seconds, T4 takes 142.8 seconds.

In the print production system 10 according to the present invention, output of image data, to which order information of an order has been related, to the control apparatus 14 is started before the order is established, that is, T1 and T2 are performed in parallel as shown in FIG. 2A, so that it is possible to swiftly start image processing after the order is established, which makes it possible to shorten a communication time (transfer time) of the image data after the order establishment.

In addition, frame IDs are related to the image data, so that even when the order information related to the image data already outputted to the control apparatus is to be changed/corrected, it is possible to make changes/corrections based on the frame IDs. As a result, even when the image data is outputted to the control apparatus before the order is established, it is possible to correctly reflect the order information at the time of the order establishment in the image data. Moreover, by outputting only the frame IDs and the corresponding order information to the control apparatus without outputting the image data, it is possible to change/correct the order information related to the image data with a shorter data communication time.

Further, output image data obtained as a result of the image processing is outputted to the printer sequentially on a frame-by-frame basis without waiting until the whole of image data corresponding to one order has undergone the image processing, so that it is possible to perform the image processing by the control apparatus and the print production by the printer in parallel. As a result, it is possible to shorten a time period from start of the image processing to completion of the print output.

As described above, by transferring image data on a frame-by-frame basis, it is possible to suitably shorten a time period from order establishment to print output completion.

Also, even when the image data of a large number of frames are corresponding to one order, through transition to the next step on a frame-by-frame basis, it is possible to shorten a time for waiting until preceding processing in the next step is completed. As a result, it is possible to perform print production with efficiency.

For comparison, a relation between processing of an order at each section and an elapsed time in a print production system, in which transfer of image data among individual sections is performed on an order-by-order basis, will be described with reference to a timing chart shown in FIG. 2B.

Figure 2B:
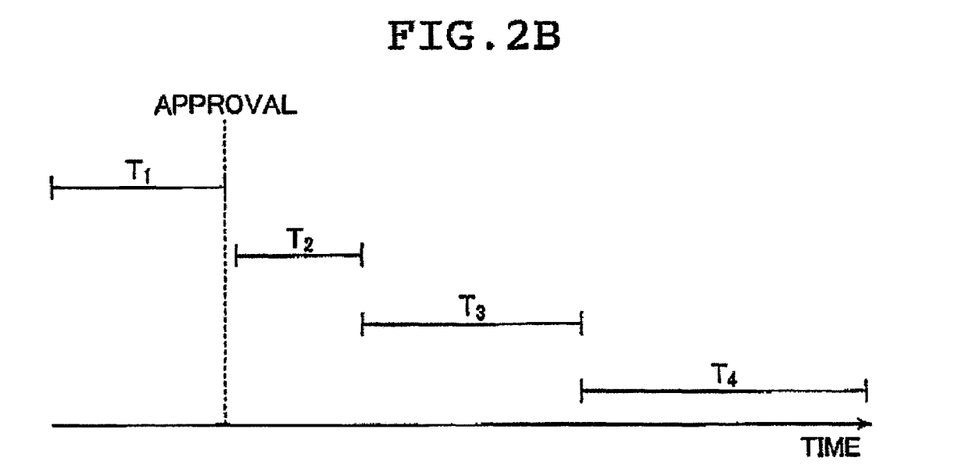
FIG. 2B is a timing chart showing a relation between an elapsed time and processing of an order at each section in a print production system in which transfer of image data among individual steps is performed on an order-by-order basis.

As shown in FIG. 2B, when transition to the next step is performed after processing of one order has been completed, a time obtained by summing up times taken by steps T2, T3, and T4 and a time (0.6 seconds, in this embodiment) for output of approval information is required after image data read by the media drive 30 or the like and order information inputted by a user, an operator, or the like are related to each other at the reception processing section 32 (step T1) and the order is established, with T2 being a step in which the image data after relating are outputted by the receiver 12 from the first output section 34 to the control apparatus 14 sequentially on a frame-by-frame basis, T3 being a step in which image processing based on the order information is performed on the image data corresponding to the approved order at the image processing section 40, and T4 being a step in which prints are produced and outputted in accordance with output image data and the order information. Here, the time taken by the processing in each step is equal to that in the case of FIG. 2A.

Therefore, when processing of image data is performed in the manner shown in FIG. 2B, a time period from establishment of an order to completion of output of prints corresponding to the order becomes 121 seconds in the case of prints of 10 frames, 206.8 seconds in the case of prints of 24 frames, 244.4 seconds in the case of prints of 30 frames, and 368.4 seconds in the case of prints of 50 frames, for instance.

In contrast to this, when image data is processed in the manner shown in FIG. 2A, the time period from establishment of an order to completion of output of prints corresponding to the order becomes 97 seconds in the case of prints of 10 frames, 145.4 seconds in the case of prints of 24 frames, 167.4 seconds in the case of prints of 30 frames, and 240.4 seconds in the case of prints of 50 frames, for instance. Here, in the example described above, it is assumed that the transfer of image data to the image processing section 40 has been completed at the time of transfer of approval information.

It can be understood from the above description that according to the present invention, it is possible to shorten the time period from establishment of an order to completion of output of prints as compared with a case where transfer of image data is performed on an order-by-order basis.

Also, when processing of the image data is performed in the same manner as in the case of FIG. 2A except that output of image data to the control apparatus is started after the order in question has been established, that is, T2 is started after T1 has been completed, the time period from the establishment of the order to completion of output of prints corresponding to the order becomes 103 seconds in the case of prints of 10 frames, 159.8 seconds in the case of prints of 24 frames, 185.4 seconds in the case of prints of 30 frames, and 270.4 seconds in the case of prints of 50 frames, for instance. Even when only output of the image data from the image processing section 40 to the printer 16 is performed on a frame-by-frame basis in this manner, it is possible to shorten the time period from the order establishment to the output completion.

In the above description, a case in which no other order is being processed during the processing of one order has been explained. If a preceding order is still being processed in the next step at the time of output of image data, it is sufficient that a buffer, spooler, or the like is provided for each of the receiver, the control apparatus, and the printer for temporary storage and sequential processing is thus performed.

Even when a preceding order is under processing and therefore outputted image data cannot be processed immediately, by outputting the image data on a frame-by-frame basis in the manner described above, it is possible to reduce a time for waiting until processing of a preceding order is completed and produce prints with efficiency, which is the case even when the number of frames corresponding to one order is large.

With the construction in which image data are readily outputted for the next processing without holding them in any step, it is possible to process the image data in one step as including all the steps in a print production system, which makes it possible to produce prints with efficiency.

Also, the amount of data outputted at a time is reduced, so that it is possible to prevent performance deterioration of each device due to concentration of data transfer processing resulting from a situation, in which large amounts of data are outputted from multiple devices at the same time, and lowering of an actual communication speed (actual transfer speed) due to concentration of traffic.

Consequently, it is possible to perform transfer of image data and order data with efficiency, which makes it possible to shorten an output time. As a result, print production with efficiency in a short time can be performed.

As described above, in the print production system 10 in this embodiment, each order designating the urgent finishing is, within a possible range, preferentially processed while getting ahead of other orders designating the ordinary finishing so that prints corresponding to the relevant order may be finished with the shortest waiting time.

Figure 3A:
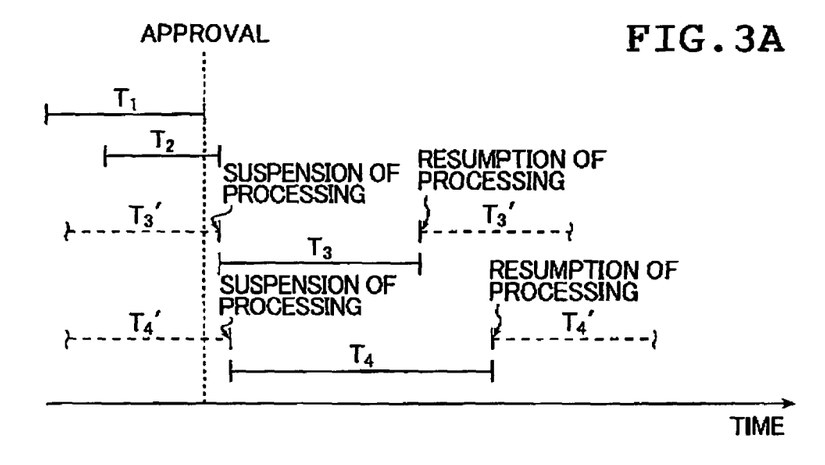
FIG. 3A is a timing chart showing an example of a relation between processing of an order at each section and an elapsed time in the print production system according to the present invention in the case where the order designates urgent finishing.

FIG. 3A is a timing chart showing an example of a relation between processing of an order at each section and an elapsed time in the print production system according to the present invention in the case where the order designates the urgent finishing.

Hereinafter, an operation of the print production system 10 in the case of an order designating the urgent finishing will be described in detail. Note that this embodiment is a case where prints corresponding to the urgent finishing order are outputted with the shortest waiting time.

First, like in the case described above, image data, to which order information including designation of the urgent finishing has been related in the receiver 12, are sequentially outputted to the control apparatus 14 (T1 and T2 shown in FIG. 3A).

Following this, the urgent finishing order is established and approval information is outputted from the receiver 12 to the control apparatus 14.

When the control apparatus 14 receives the approval information, the printing sequence determination section 42 determines the position of the urgent finishing order in a processing sequence. If output of prints corresponding to other orders can be completed before predicted times even when the urgent finishing order is processed before the other orders, the printing sequence determination section 42 determines the position of the urgent finishing order in a processing sequence so that prints corresponding to the urgent finishing order may be outputted with the shortest waiting time.

Based on the processing sequence determined by the printing sequence determination section 42, the image processing section 40 suspends processing (T3' shown in FIG. 3A) of an order, in response to which image processing is being performed at the time of the reception of the approval information, and starts image processing (T3 shown in FIG. 3A) of the image data corresponding to the urgent finishing order. In this embodiment, the image processing section 40 starts the image processing of the image data corresponding to the urgent finishing order when image processing of the image data of a frame, which is being carried out at the time of reception of the approval information, has been completed.

The image processing section 40 obtains output image data by performing the image processing and outputs the output image data to the second output section 44 sequentially on a frame-by-frame basis. The second output section 44 outputs the output image data to the printer 16.

On receiving the output image data corresponding to the urgent finishing order, based on the control from the control apparatus 14, that is, the determination of the printing sequence determination section 42, the printer 16 suspends print production (T4' shown in FIG. 3A) from image data corresponding to an order under processing, and produces prints from the output image data corresponding to the urgent finishing order and outputs the prints (T4 shown in FIG. 3A). In this embodiment, the printer 16 starts the print production from the output image data corresponding to the urgent finishing order when print production from the image data of a frame, which is being performed at the time of reception of the output image data corresponding to the urgent finishing order, has been completed.

When the image processing of the image data corresponding to the urgent finishing order is completed, the image processing section 40 resumes the suspended image processing (T3' shown in FIG. 3A) and when the production of the prints from the output image data corresponding to the urgent finishing order and their output are completed, the printer 16 resumes the suspended print production (T4' shown in FIG. 3A).

By performing transfer of image data on a frame-by-frame basis in the manner described above, it is possible to perform processing of an urgent finishing order by suspending processing of other orders, that is, by performing interruption on a frame-by-frame basis, which makes it possible to output prints corresponding to the urgent finishing order swiftly in a short time. In particular, when the prints corresponding to the urgent finishing order are outputted in the shortest time, it is possible to output the prints in substantially the same time as that taken in the case where the prints are produced by performing the transfer of the image data on a frame-by-frame basis under a state in which no other order is being processed.

Figure 3B:
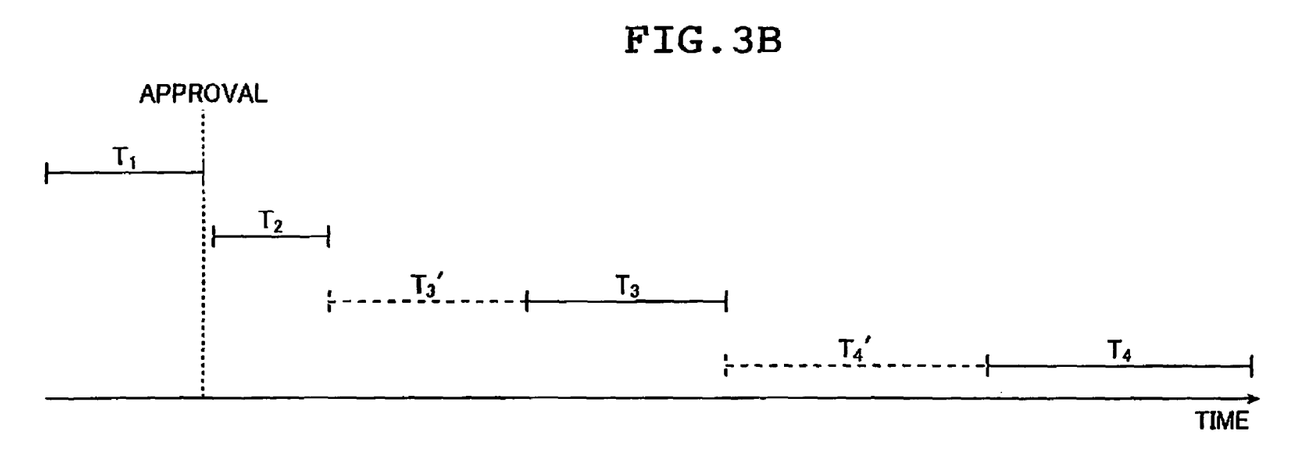
FIG. 3B is a timing chart showing a relation between processing of an order at each section and an elapsed time in a print production system in which transfer of image data among individual steps is performed on an order-by-order basis, in the case where the order designates the urgent finishing.

For comparison, FIG. 3B shows a timing chart representing a relation between processing of an order at each section and an elapsed time in a print production system, in which transfer of image data among individual steps is performed on an order-by-order basis, in the case of an order designating the urgent finishing.

In the control by orders, even in the case of the urgent finishing, interruption can only be performed on an order-by-order basis. Therefore, assuming that an order for production of prints from 24 frames is under processing at both the image processing section 40 and the printer 16 when the image data corresponding to an urgent finishing order for production of prints from 24 frames are transferred, the urgent finishing order is processed after image processing (T3') and print production and output (T4') corresponding to the order that is under processing at the time of the transfer have been completed, as shown in FIG. 3B. As a result, the time period from order establishment to output is 341.2 seconds in this embodiment.

If an order for print production from 24 frames is being processed at the image processing section 40 when the image data corresponding to an urgent finishing order are transferred thereto, the urgent finishing order is processed after the image processing (T3') corresponding to the order that is under processing at the time of the transfer has been completed, so that the time period from the order establishment to output is 257.8 seconds in this embodiment even if print production and output can be started directly after the image data corresponding to the urgent finishing order are transferred to the printer 16.

That is, in the processing by orders, it is impossible to start processing (image processing, print production and output) of image data corresponding to an urgent finishing order until processing (image processing, print production and output) based on a preceding order is completed, so that a long time is taken by the processing.

In contrast to this, with the print production system according to the present invention, a time period from establishment of an order for print production from 24 frames with urgent finishing to output of the prints can be reduced to 151 seconds in this embodiment by performing interruption on a frame-by-frame bases as shown in FIG. 3A, even when other orders are already under processing at individual sections. More specifically, it is possible to perform processing after the establishment of the urgent finishing order, including the output of the prints, in a time obtained by summing up: a transfer time (0.6 seconds in this embodiment) of approval information; a time (2 seconds in this embodiment) taken to complete image processing which is being performed on the image data of a given frame at the image processing section at the time of reception of the approval information; a time (2 seconds in this embodiment) taken to perform image processing on the image data of the first frame designated in the urgent finishing order; a time (3.6 seconds in this embodiment) taken to complete print production from a given frame which is being performed by the printer 16 at the time of reception of the image data corresponding to the urgent finishing order; and a time (142.8 seconds in this embodiment) taken to produce prints from the output image data corresponding to the urgent finishing order and output the prints.

That is, it is possible to shorten a time period from establishment of an order to completion of output of prints as compared with a case where no other order is under processing at the time of the order establishment and image data are transferred on an order-by-order basis.

As described above, according to the present invention, it is possible to complete processing after order establishment, including output of prints, within three minutes in the case of 24 prints and within two minutes in the case of 10 prints, for instance.

Also, even when output of image data from the receiver to the control apparatus is started after order establishment and subsequent processing is performed on a frame-by-frame basis, that is, even when only the output of the data from the receiver to the control apparatus is performed on an order-by-order basis and other processing is performed on a frame-by-frame basis, it is possible to reduce the time period from the order establishment to the output to 165.4 seconds in this embodiment. That is, the time period from the order establishment to the output can be reduced as compared with a case of the control on an order-by-order basis.

Here, in the embodiment described above, the printing sequence determination section 42 determines the printing sequence in accordance with the presence or absence of the designation of urgent finishing. However, the present invention is not limited to this and the printing sequence determination section 42 may determine the printing sequence based on various other conditions.

For instance, when an order is placed, a desired delivery date and time may be selected from among various delivery dates and times such as next day delivery, as well as the designation of urgent finishing or ordinary finishing. In that case, the printing sequence will be determined in accordance with the selected desired delivery date and time.

In another embodiment, during processing of an order for print production from a large number of frames, an order for print production from a small number of frames, if any, may be processed in advance by suspending the processing of the preceding order every time the processing is achieved with respect to a predetermined number of frames.

More specifically: When an order for print production from 200 frames is placed, the order may be considered to be divided into four orders each designating 50 frames. Then, if an order for print production from frames, the number of which is equal to or less than 20, for instance, is placed, image processing and print production corresponding to the preceding order may be suspended when one of the above four orders has been processed, and the succeeding order may be processed for print output prior to the preceding order through interruption. In this regard, when an order for print production from frames, the number of which is more than 20 but not more than 50, is placed during the processing of the order designating 200 frames, the succeeding order is so processed that print production corresponding to the order may be performed after print output corresponding to the preceding order.

That is, the printing sequence may be determined as follows: An order designating the frames whose number, A, is larger is divided into a plurality of orders each designating the frames whose number is B. An order designating the frames whose number is C or less is processed for printing between the orders designating B frames, that is, by suspending the processing of the order designating A frames when one of the orders designating B frames has been processed. An order designating the frames whose number, D, satisfies "C<D<B" is processed after the order designating A frames has been processed, that is, in accordance with a reception sequence.

Moreover, by dividing an order into a plurality of orders each designating B frames and discharging prints to a plurality of sorters such that groups of prints, which groups are corresponding to the orders designating B frames, respectively, are distributed to different sorters, the number of the prints discharged to each sorter is prevented from exceeding a certain magnitude. Such prevention of the number of the prints discharged to each sorter from exceeding a certain magnitude enables the downsizing of sorters.

In this regard, the frame numbers B and C as above are of a certain magnitude and can be set by an operator arbitrarily in accordance with the purpose of use, apparatus configuration, ordering situation, and so forth.

By determining the printing sequence in the manner as described above, even when many orders are placed, it is possible to process an order for a small number of prints (order for print production from a small number of frames), which is processible in a short time with less influence on other orders, in a short time. As a result, in the case of orders for production of several prints or the like, the prints can be delivered to users with short waiting times. That is, it is possible to deliver the prints to the users, who placed the orders, on the spot with short waiting times, which can eliminate a necessity for the users to revisit a store to receive the prints.

In the embodiment described above, transfer of image data is performed on a frame-by-frame basis because it is possible to reduce a time period from order establishment to print output to the minimum with this construction. However, the present invention is not limited to this and the transfer of image data may be performed such that the image data of a predetermined number of frames are transferred at a time. In this regard, it is preferable that the number of frames can be arbitrarily set by an operator.

With this construction, it is possible to make an appropriate setting corresponding to a use method and an apparatus configuration, which improves convenience.

Also, the image data transfer on a frame-by-frame basis and the image data transfer on an order-by-order basis may be combined with each other. For instance, output of image data from the receiver to the control apparatus may be performed on an order-by-order basis after relating of the image data and order information to each other has been completed and an order has been established, and the image data having undergone image processing may be outputted to the printer, on a frame-by-frame basis or such that the image data of a predetermined number of frames are transferred at a time, for print production and output. By performing transfer of image data in at least one place on a frame-by-frame basis or such that the image data of a predetermined number of frames are transferred at a time, it is possible to prevent lowering of a communication speed (transfer speed) and performance at each device, which makes it possible to shorten a time for waiting in a preceding step until processing is completed.

It is preferable that the image data transfer from the image processing section 40 to the printer be so performed that the image data of a predetermined number of frames are transferred at a time and it is more preferable that every image data transfer be so performed that the image data of a predetermined number of frames are transferred at a time because the processing efficiency of the print production system is suitably improved as a whole with this construction.

It should be noted that the production system 10 can also cope with print production from a photographic film such as a negative film.

Figure 4:
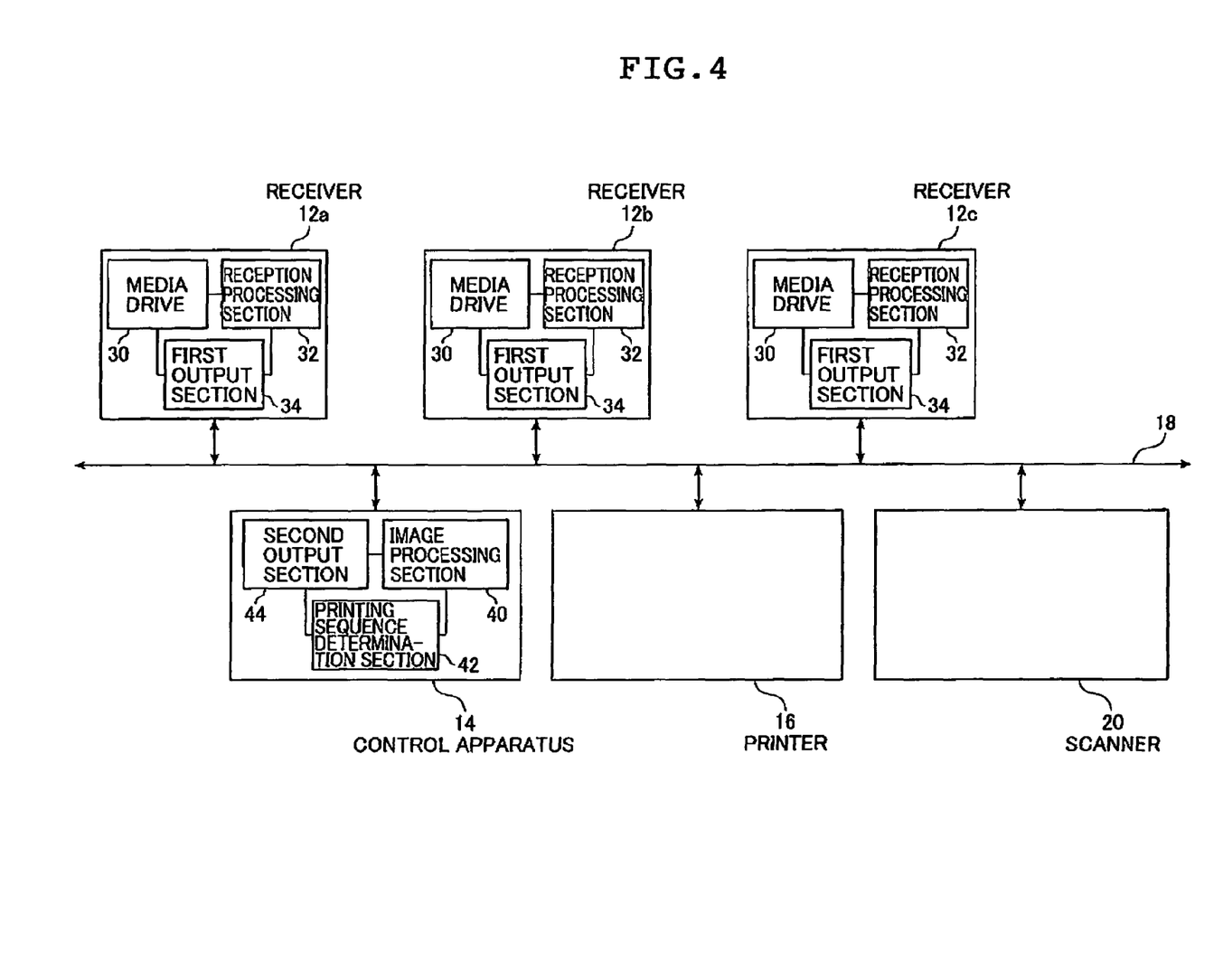
FIG. 4 is a block diagram conceptually showing another example of the print production system according to the present invention.

FIG. 4 is a block diagram showing an example of the print production system according to the present invention, which copes with print production from a photographic film.

A scanner 20 is a device such as a scanner or an image processor, which reads images from a photographic film such as a negative film, and is connected to a known network 18.

The scanner 20 photoelectrically reads images photographed on a photographic film, obtains output images by performing predetermined image processing on the read images, relates inputted order information to the output images, and outputs the order information and the output images related to each other to the control apparatus 14. The control apparatus 14 determines an output sequence of the output image data outputted from the scanner 20 and outputs the output image data to the printer 16 based on the determined sequence.

The printer 16 produces prints from the outputted output image data and outputs the prints based on a determination of a printing sequence determination section 42 like in the case of the embodiments as described above.

Also, in the example described above, the image processing of the read image data is performed at the scanner 20 but the present invention is not limited to this. For instance, the image data generated through the reading by the scanner 20 may be outputted to the control apparatus 14, the order information corresponding to the image data may be inputted at the control apparatus 14, and the image data and the order information may be related to each other. Following this, like in the case described above, the output image data may be generated by performing the image processing corresponding to the order information on the acquired image data and the print images may be supplied to the printer 16.

Here, after a negative film or the like has been read with the film scanner, verification or the like of image data of images read from the film is performed. Such inspection needs to be performed on a film-by-film basis, so that when image data is obtained with the film scanner, processing may be performed on a film-by-film basis.

It is preferable that a selection from among image data output and processing on an order-by-order basis, image data output and processing performed on the image data of a predetermined number of frames at a time, and image data output and processing on a frame-by-frame basis can be made in accordance with what image data acquisition means is used or in accordance with the purpose of use of an operator in the manner described above.

With this construction, it is possible to perform appropriate processing in accordance with the configuration and purpose of use of the print production system, which makes it possible to suitably cope also with a negative film or the like. As a result, convenience of an operator is improved.

Here, in this embodiment, the image data output from the receiver to the control apparatus is performed by the first output section 34 and the image data output from the image processing apparatus to the printer is performed by the second output section 44. However, the present invention is not limited to this and direct image data transfer may be performed without providing the output sections. Also, the image data output method and transfer method are not specifically limited and various communication means can be used regardless of whether the communication means performs wired communication or wireless communication.

Further, it is also possible to cause each of the first output section 34 and the second output section 44 to function as a buffer or a spooler by adjusting the number of image data items outputted and the timing of the output.

The print production system according to the present invention has been described in detail above. However, the present invention is not limited to the embodiments described above and it is of course possible to make various modifications and changes without departing from the gist of the present invention.

For instance, in the embodiment described above, an output sequence of image data received is determined by orders by the printing sequence determination section, but the printing sequence determination section is not necessarily required to be provided. For instance, the image data received from the receivers may be processed by orders received.

Also, in the example described above, a photo printer that obtains finished prints by imagewisely exposing a photosensitive material (printing paper), performing wet development processing, and drying on the exposed photosensitive material has been described as an example of the printer 16 that outputs prints. However, the present invention is not limited to this. It is possible to use as the printer that outputs prints various other printers such as an electrophotographic printer, an ink jet printer, and a printer that uses a photosensitive heat development image recoding medium and transfers images onto image receiving paper using an image forming solvent such as water.

What is claimed is:

1. A print production system, comprising:
   at least one order receiver, each including
      image acquisition means for acquiring first image data of first images to perform print orders, each ordering at least one print,
      input means for inputting a print order for ordering as one order a print or prints of a second image or images selected from said first images corresponding to said first image data acquired by said image acquisition means, and
      reception processing means for creating order information on an order-by-order basis based on said print order inputted by said input means, and for relating the created order information and second image data of said second image or images corresponding to the inputted print order to each other,
      wherein each order receiver outputs said order information and said second image data related to each other by said reception processing means; and
   an image forming apparatus including
      image processing means for performing image processing on said second image data outputted from said order receiver to create third image data, and
      print production means for producing said print or prints of said second image or images corresponding to said third image data based on said third image data on which said image processing has been performed by said image processing means,
      wherein said print or prints of said second image or images are produced in accordance with said order information by said print production means and outputted,
   wherein at least one of transfer of said second image data from said reception processing means of said order receiver to said image processing means of said image forming apparatus and transfer of said third image data from said image processing means of said image forming apparatus to said print production means thereof is performed such that image data of images of a predetermined number of frames are transferred at a time.

2. The print production system according to claim 1, wherein said order receiver further includes a first output means for outputting said second image data to said image forming apparatus, and
   wherein said image forming apparatus further includes a second output means for outputting said third image data from said image processing means to said print production means.

3. The print production system according to claim 2, wherein at least one of transfer of said second image data from said reception processing means to said first output means, transfer of said second image data from said first output means to said image processing means, transfer of said third image data from said image processing means to said second output means, and transfer of said third image data from said second output means to said print production means is performed such that the image data of the images of the predetermined number of frames are transferred at a time.

4. The print production system according to claim 2, wherein said image processing means starts said image processing after reception of said second image data corresponding to one order in said print orders has been completed.

5. The print production system according to claim 1, wherein every transfer of said second and third image data is performed such that the image data of the images of the predetermined number of frames are transferred at a time.

6. The print production system according to claim 1, wherein the transfer of said second and third image data is performed such that the image data of an image of one frame is transferred at a time.

7. The print production system according to claim 1, wherein said image forming apparatus further includes distribution means for distributing output prints in accordance with which order receiver has outputted said print order corresponding to said output prints.

8. The print production system according to claim 1,
wherein said image forming apparatus further includes print producing sequence setting means for setting a print producing sequence for each print order, and
wherein said print producing sequence setting means discriminates a number of frames corresponding to said print order based on said order information corresponding to said print order, and sets a position of said print producing sequence of said print order in case that the discriminated number of frames is equal to or less than a predetermined number prior to a position of said print producing sequence of other print orders which has already been set in case that the discriminated number of frames is more than said predetermined number.

9. The print production system according to claim 1,
wherein said order receiver has a function for selection of urgent finishing in which print production is performed preferentially and, when said urgent finishing has been selected, outputs urgent information showing that said urgent finishing has been selected, by giving said urgent information to said order information,
wherein said image forming apparatus further includes print producing sequence setting means for setting a print producing sequence for each print order, and
wherein said print producing sequence setting means discriminates whether said urgent finishing has been selected for said print order based on said order information corresponding to said print order, and sets a position of said print producing sequence of said print order in case that said urgent finishing has been selected for said print order prior to a position of said print producing sequence of other print orders which has already been set.

10. The print production system according to claim 1, further comprising a film scanner that generates said first image data by reading a photographic film.

11. The print production system according to claim 1,
wherein said image forming apparatus further includes order processing sequence setting means for setting an order processing sequence for each print order, and
wherein said order processing sequence setting means discriminates a number of frames corresponding to said print order based on said order information corresponding to said print order and sets said order processing sequence so that when the discriminated number of frames is equal to or less than a predetermined number, said print order is processed preferentially with respect to other print orders for each of which said print processing order setting has already been set and in which said discriminated number of frames is more than said predetermined number.

12. The print production system according to claim 1,
wherein said order receiver has a function for selection of urgent finishing in which print production is performed preferentially and, when said urgent finishing has been selected, outputs urgent information showing that said urgent finishing has been selected, by giving said urgent information to said order information,
wherein said image forming apparatus further includes order processing sequence setting means for setting an order processing sequence for each print order, and
wherein said order processing sequence setting means discriminates whether said urgent finishing has been selected for said print order based on said order information corresponding to said print order and sets said order processing sequence so that when said urgent finishing has been selected for said print order, said print order is processed preferentially with respect to other print orders for each of which said order processing sequence has already been set.

* * * * *